(12) United States Patent
Chen et al.

(10) Patent No.: US 12,428,558 B2
(45) Date of Patent: Sep. 30, 2025

(54) HIGH COMPARATIVE TRACKING INDEX POLYCARBONATE COMPOSITIONS WITH IMPROVED FLAME RETARDANT AND HYDRO-STABILITY PROPERTIES

(71) Applicant: SHPP GLOBAL TECHNOLOGIES B.V., Bergen op Zoom (NL)

(72) Inventors: Keran Chen, Shanghai (CN); Xing Liu, Shanghai (CN); Yun Zheng, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/953,569

(22) Filed: Nov. 20, 2024

(65) Prior Publication Data

US 2025/0163266 A1 May 22, 2025

(30) Foreign Application Priority Data

Nov. 21, 2023 (EP) .................................... 23211080
Apr. 30, 2024 (EP) .................................... 24173431

(51) Int. Cl.
*C08L 69/00* (2006.01)
*C08K 5/42* (2006.01)

(52) U.S. Cl.
CPC ............... *C08L 69/00* (2013.01); *C08K 5/42* (2013.01); *C08L 2201/02* (2013.01); *C08L 2205/025* (2013.01); *C08L 2205/035* (2013.01); *C08L 2207/53* (2013.01)

(58) Field of Classification Search
None
See application file for complete search history.

(56) References Cited

U.S. PATENT DOCUMENTS

| | | |
|---|---|---|
| 4,636,544 A | 1/1987 | Hepp |
| 4,900,784 A | 2/1990 | Tabankia et al. |
| 7,309,730 B2 | 12/2007 | Kim |
| 8,404,772 B2 | 3/2013 | Van Der Mee et al. |
| 8,440,762 B2 | 5/2013 | Van Der Mee et al. |
| 11,518,880 B2 | 12/2022 | Liu et al. |
| 2012/0184661 A1* | 7/2012 | van der Mee ..... C08G 59/3218 524/508 |
| 2013/0270591 A1 | 10/2013 | de Brouwer et al. |
| 2014/0371360 A1 | 12/2014 | Zheng et al. |
| 2018/0223098 A1* | 8/2018 | Inazawa ................. C08L 51/04 |
| 2019/0284391 A1 | 9/2019 | Van De Wetering et al. |

FOREIGN PATENT DOCUMENTS

| | | | |
|---|---|---|---|
| CN | 102070886 A | | 5/2011 |
| CN | 102093675 A | | 6/2011 |
| EP | 4092081 A1 | | 11/2022 |
| JP | 2011-208150 A | | 10/2011 |
| WO | 2009/083913 A1 | | 7/2009 |
| WO | 2012/135446 A1 | | 10/2012 |
| WO | 2021/090095 A1 | | 5/2021 |
| WO | 2022/189998 A1 | | 9/2022 |
| WO | WO 2022/189998 | * | 9/2022 |
| WO | 2022/228952 A1 | | 11/2022 |
| WO | 2023/148566 A1 | | 8/2023 |
| WO | 2023/180190 A1 | | 9/2023 |

OTHER PUBLICATIONS

Extended European Search Report mailed Sep. 23, 2024 in EP24173431.8 (5 pgs.).
Extended European Search Report mailed Apr. 18, 2024 in EP23211080.9 (5 pgs.).
International Search Report and Written Opinion mailed Feb. 25, 2025 in PCT/IB2024/061617 (9 pgs.).

* cited by examiner

*Primary Examiner* — Robert T Butcher
(74) *Attorney, Agent, or Firm* — Quicker Law, LLC

(57) ABSTRACT

Polycarbonate compositions include: (a) from about 45 wt % to about 90 wt % of a polycarbonate homopolymer; (b) from about 1 wt % to about 25 wt % of a polycarbonate copolymer; (c) from about 0.1 wt % to about 20 wt % of a first flame retardant component including a brominated flame retardant; (d) from about 0.01 wt % to about 1 wt % of a second flame retardant component including an alkyl sulfonate salt, an aromatic sulfone sulfonate, an aromatic sulfonate salt, or a combination thereof; and (e) from about 0.1 wt % to about 20 wt % of a siloxane-free acrylic core-shell impact modifier. The combined weight percent value of all components does not exceed 100 wt %, and all weight percent values are based on the total weight of the composition.

14 Claims, No Drawings

HIGH COMPARATIVE TRACKING INDEX POLYCARBONATE COMPOSITIONS WITH IMPROVED FLAME RETARDANT AND HYDRO-STABILITY PROPERTIES

FIELD OF THE DISCLOSURE

The present disclosure relates to polycarbonate compositions, and in particular to polycarbonate compositions that include a combination of flame retardant components and a siloxane-free acrylic core-shell impact modifier. The compositions have good comparative tracking index and flame retardant properties.

BACKGROUND OF THE DISCLOSURE

Polycarbonates are useful in the manufacture of articles and components for a wide range of applications, from automotive parts to electronic appliances. Because of their broad use, particularly in electronics applications, it is desirable to provide polycarbonates with improved hydrolytic stability and electrical tracking resistance (measured by comparative tracking index, CTI).

The current CTI 600V (IEC60112) & CTI PLC0 (ASTM D3638) polycarbonate (PC)-based solutions have a UL94 V0 flame retardance (FR) performance at 1.2 millimeters (mm), but it has been a challenge to develop PC compositions that satisfy V0 performance in thinner designs. Additionally, the hydro-stability of current PC compositions is insufficient for them to be widely adopted in new part designs.

There accordingly remains a need in the art for thermoplastic compositions that have improved hydro stability and good CTI performance. It would be a further advantage if thermoplastic compositions had good low-temperature impact resistance and good flame retardance.

These and other shortcomings are addressed by aspects of the present disclosure.

SUMMARY

Aspects of the disclosure relate to polycarbonate compositions including: (a) from about 45 wt % to about 90 wt % of a polycarbonate homopolymer; (b) from about 1 wt % to about 25 wt % of a polycarbonate copolymer; (c) from about 0.1 wt % to about 20 wt % of a first flame retardant component including a brominated flame retardant; (d) from about 0.01 wt % to about 1 wt % of a second flame retardant component including an alkyl sulfonate salt, an aromatic sulfone sulfonate, an aromatic sulfonate salt, or a combination thereof; and (e) from about 0.1 wt % to about 20 wt % of a siloxane-free acrylic core-shell impact modifier. The combined weight percent value of all components does not exceed 100 wt %, and all weight percent values are based on the total weight of the composition.

DETAILED DESCRIPTION

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate homopolymer" includes mixtures of two or more polycarbonate homopolymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "$M_w$," can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g., polycarbonate polymers, by methods well known to a person having ordinary skill in the art using molecular weight standards, e.g., polycarbonate standards or polystyrene standards, preferably certified or traceable molecular weight standards.

The terms "BisA," "BPA," or "bisphenol A," which can be used interchangeably, as used herein refers to a compound having a structure represented by the formula:

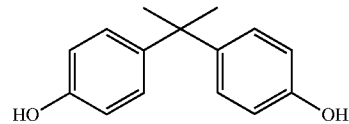 [SMILES: CC(C)(c1ccc(O)cc1)c1ccc(O)cc1]

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the raw materials used in example and/or comparative compositions described herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Aspects of the disclosure include a polycarbonate composition including: (a) from about 45 wt % to about 90 wt % of a polycarbonate homopolymer; (b) from about 1 wt % to about 25 wt % of a polycarbonate copolymer; (c) from about 0.1 wt % to about 20 wt % of a first flame retardant component including a brominated flame retardant; (d) from about 0.01 wt % to about 1 wt % of a second flame retardant component including an alkyl sulfonate salt, an aromatic sulfone sulfonate, an aromatic sulfonate salt, or a combination thereof; and (e) from about 0.1 wt % to about 20 wt % of a siloxane-free acrylic core-shell impact modifier. The combined weight percent value of all components does not exceed 100 wt %, and all weight percent values are based on the total weight of the composition.

In certain aspects the composition includes at least 45 wt %, or at least, or at least 50 wt %, or at least 55 wt %, or at least 60 wt %, or at least 65 wt %, or at least 70 wt %, or at least 75 wt %, or at most 90 wt %, or at most 85 wt %, or at most 80 wt %, or at most 75 wt %, or at most 70 wt %, or at most 65 wt %, of the polycarbonate homopolymer.

The polycarbonate homopolymer component may include bisphenol-A (BPA) homopolymer in some aspects. Suitable polycarbonate homopolymers are available from SABIC. In some aspects the polycarbonate homopolymer component includes at least two polycarbonate homopolymers, such as a combination of a low flow polycarbonate homopolymer and a high flow polycarbonate homopolymer. An exemplary low flow polycarbonate homopolymer is available from SABIC and is a bisphenol A polycarbonate (linear) endcapped with para-cumyl phenol having a Mw of about 15-35k and a melt flow rate (MFR) at 300° C. and 1.2 kg of about 15-30 g/10 min as determined in accordance with ASTM D1238. An exemplary high flow polycarbonate homopolymer is available from SABIC and is a bisphenol A polycarbonate (linear) endcapped with para-cumyl phenol having a Mw of about 40-55k and an MFR at 300° C. and 1.2 kg of about 4-12 g/10 min. MFR is determined in accordance with ASTM D1238.

In specific aspects the composition includes from about 30 wt % to about 75 wt %, or at least 30 wt %, or at least 35 wt %, or at least 40 wt %, or at least 45 wt %, or at least 50 wt %, or at least 55 wt %, or at most 60 wt %, or at most 70 wt %, or at most 65 wt %, or at most 60 wt %, or at most 55 wt %, or at most 50 wt %, of a low flow polycarbonate homopolymer.

In certain aspects the composition includes from about 5 wt % to about 30 wt %, or at least 5 wt %, or at least 10 wt %, or at least 15 wt %, or at most 30 wt %, or at most 25 wt %, or at most 20 wt %, or at most 15 wt %, of a high flow polycarbonate homopolymer.

The polycarbonate copolymer may in some aspects include a poly(aliphatic ester-carbonate) copolymer such as a sebacic acid/BPA PC copolymer including sebacic acid monomer units and bisphenol-A monomer units. Sebacic acid has the following structure:

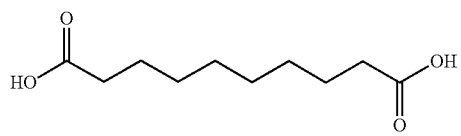

Bisphenol-A has the structure:

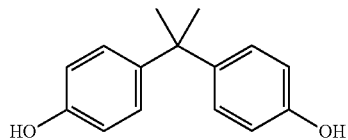 [SMILES: CC(C)(c1ccc(O)cc1)c1ccc(O)cc1]

As a copolymer, the sebacic acid monomer provides the copolymer with good flow and ductility properties at a lower processing temperature, while the BPA monomer provides improved heat and modulus properties. Exemplary sebacic acid/BPA copolymers include a high molecular weight (Mw) high flow/ductile (HFD) polycarbonate, a low Mw HFD polycarbonate, or a combination thereof. In certain aspects the composition includes a polycarbonate copolymer component including from about 0.1 mol % to about 10 mol % sebacic acid monomer units and from about 90 mol % to about 99.9 mol % bisphenol-A monomer units.

The composition includes in some aspects from about 1 wt % to about 25 wt % of the polycarbonate copolymer. In other aspects the composition includes at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %, or at most 25 wt %, or at most 24 wt %, or at most 23 wt %, or at most 22 wt %, or at most 21 wt %, or at most 20 wt %, or at most 19 wt %, or at most 18 wt %, or at most 17 wt %, or at most 16 wt %, or at most 15 wt %, or at most 14 wt %, or at most 13 wt %, or at most 12 wt %, or at most 11 wt %, or at most 10 wt %, of the polycarbonate copolymer.

Compositions according to aspects of the disclosure include from about 0.1 wt % to about 20 wt % of a first flame retardant component including a brominated flame retardant. In certain aspects the first flame retardant component includes a brominated polycarbonate, a brominated polyacrylate, a brominated cyanurate, or a combination thereof. In some aspects the composition includes at least 0.1 wt %, or at least 0.5 wt %, or at least 1.0 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %, or at least 11 wt %, or at least 12 wt %, or at least 13 wt %, or at least 14 wt %, or at least 15 wt %, or at most 20 wt %, or at most 19 wt %, or at most 18 wt %, or at most 17 wt %, or at most 16 wt %, or at most 15 wt %, or at most 14 wt %, or at most 13 wt %, or at most 12 wt %, or at most 11 wt %, or at most 10 wt %, or at most 9 wt %, or at most 8 wt %, or at most 7 wt %, or at most 6 wt %, of the first flame retardant component.

Compositions according to aspects of the disclosure include from about 0.01 wt % to about 1 wt % of a second flame retardant component including an alkyl sulfonate salt, an aromatic sulfone sulfonate, an aromatic sulfonate salt, or a combination thereof. In certain aspects the composition includes at least 0.05 wt %, or at least 0.1 wt %, or at least 0.15 wt %, or at least 0.2 wt %, or at least 0.25 wt %, or at least 0.3 wt %, or at least 0.35 wt %, or at least 0.4 wt %, or at least 0.45 wt %, or at least 0.5 wt %, or at least 0.55 wt %, or at least 0.6 wt %, or at least 0.65 wt %, or at least 0.7 wt %, or at least 0.75 wt %, or at least 0.8 wt %, or at most 1 wt %, or at most 0.95 wt %, or at most 0.9 wt %, or at most 0.85 wt %, or at most 0.8 wt %, or at most 0.75 wt %, or at most 0.7 wt %, or at most 0.65 wt %, or at most 0.6 wt %, or at most 0.55 wt %, or at most 0.5 wt %, or at most 0.45 wt %, or at most 0.4 wt %, or at most 0.35 wt %, or at most 0.3 wt %, of the second flame retardant component.

In certain aspects the thermoplastic composition has a total bromine content of from about 0.5 wt % to about 8 wt %. In some aspects the composition has a total bromine content of from about 1 wt % to about 8 wt %, or from about 1.5 wt % to about 8 wt %, or from about 2 wt % to about 8 wt %, or from about 2.5 wt % to about 8 wt %, or from about 3 wt % to about 8 wt %, or from about 3.5 wt % to about 8 wt %, or from about 4 wt % to about 8 wt %, or from about 0.5 wt % to about 7.5 wt %, or from about 0.5 wt % to about 7 wt %, or from about 0.5 wt % to about 6.5 wt %, or from about 0.5 wt % to about 6 wt %, or from about 0.5 wt % to about 5.5 wt %, or from about 0.5 wt % to about 5 wt %, or from about 0.5 wt % to about 4.5 wt %, or from about 0.5 wt % to about 4 wt %, or from about 0.5 wt % to about 3.5 wt %, or from about 0.5 wt % to about 3 wt %. In specific aspects the composition has a total bromine content of from about 1.5 wt % to about 4 wt %.

In some aspects the siloxane-free acrylic core-shell impact modifier includes acrylate rubber as the core. An exemplary siloxane-free acrylic core-shell impact modifier is EXL-2390, available from Dow. In certain aspects the composition includes at least 0.1 wt %, or at least 0.5 wt %, or at least 1 wt %, or at least 1.5 wt %, or at least 2 wt %, or at least 2.5 wt %, or at least 3 wt %, or at least 3.5 wt %, or at least 4 wt %, or at least 4.5 wt %, or at least 5 wt %, or at least 5.5 wt %, or at least 6 wt %, or at least 6.5 wt %, or at least 7 wt %, or at least 7.5 wt %, or at least 8 wt %, or at least 8.5 wt %, or at least 9 wt %, or at least 9.5 wt %, or at least 10 wt %, or at most 20 wt %, or at most 19 wt %, or at most 18 wt %, or at most 17 wt %, or at most 16 wt %, or at most 15 wt %, or at most 14 wt %, or at most 13 wt %, or at most 12 wt %, or at most 11 wt %, or at most 10 wt %, or at most 9 wt %, or at most 8 wt %, of the siloxane-free acrylic core-shell impact modifier.

Compositions according to certain aspects of the disclosure include from greater than 0 wt % to about 2 wt % of an anti-drip agent. In particular aspects the anti-drip agent includes styrene acrylonitrile encapsulated polytetrafluoroethylene (SAN-PTFE). In further aspects the composition includes at least 0.05 wt %, or at least 0.1 wt %, or at least 0.15 wt %, or at least 0.2 wt %, or at least 0.25 wt %, or at least 0.3 wt %, or at least 0.35 wt %, or at least 0.4 wt %, or at least 0.45 wt %, or at least 0.5 wt %, or at most 2 wt %, or at most 1.9 wt %, or at most 1.8 wt %, or at most 1.7 wt %, or at most 1.6 wt %, or at most 1.5 wt %, or at most 1.4 wt %, or at most 1.3 wt %, or at most 1.2 wt %, or at most 1.1 wt %, or at most 1 wt %, or at most 0.9 wt %, or at most 0.8 wt %, or at most 0.7 wt %, or at most 0.6 wt %, or at most 0.5 wt %

In other aspects the composition includes at least one additional additive. The at least one additional additive may include, but is not limited to, an acid scavenger, an anti-drip agent, an antioxidant, an antistatic agent, a chain extender, a colorant, a release agent, a flow promoter, a lubricant, a plasticizer, a quenching agent, an additional flame retardant, a V stabilizer, a UV reflecting additive, an additional impact modifier, a blowing agent, a reinforcing agent, or a combination thereof. The composition may in certain aspects include from greater than 0 wt % to about 10 wt % of the at least one additional additive. In further aspects the composition includes at least 0.1 wt %, or at least 0.5 wt %, or at least 1 wt %, or at least 1.5 wt %, or at least 2 wt %, or at least 2.5 wt %, or at least 3 wt %, or at most 10 wt %, or at most 9 wt %, or at most 8 wt %, or at most 7 wt %, or at most 6 wt %, or at most 5 wt %, or at most 4 wt %, of the at least one additional additive.

In a specific aspect the composition does not include a polyester component. It may be difficult for compositions including a polyester component to achieve desired FR properties.

In certain aspects the composition is free of siloxane. As used herein, "free of siloxane" means that the composition includes less than 1.0 wt %, or less than 0.9 wt %, or less than 0.8 wt %, or less than 0.7 wt %, or less than 0.6 wt %, or less than 0.5 wt %, or less than 0.4 wt %, or less than 0.3 wt %, or less than 0.2 wt %, or less than 0.1 wt %, or less than 0.01 wt %, or less than 0.001 wt %, or 0.0001 wt %, or 0 wt % siloxane.

Compositions according to aspects of the disclosure may have improved comparative tracking index (CTI) properties as compared to conventional compositions. In some aspects the composition has a CTI rating of PLC0 as determined in accordance with ASTM D3638.

In further aspects the composition has a notched Izod impact strength (NII) retention of at least 10% after 3000 hours of DH85 aging at a temperature of 85° C. and 85% relative humidity. NII is evaluated before and after DH85 aging and is tested at a temperature of 23° C. according to ASTM D256. In further aspects the composition has a NII retention of at least 12%, or at least 14%, or at least 16%, or at least 18%, or at least 20%, or at least 25%, or at least 30%, or at least 35%, or at least 40%, or at least 45%, or at least 50%, or at least 55%, or at least 60%, after 3000 hours of DH85 aging at a temperature of 85° C. and 85% relative humidity.

In particular aspect the composition has a UL94 flame retardant rating of V0 at a thickness of 1.0 millimeter.

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded. In particular aspects the article is a component of a consumer electronics device, an electrical connector, an insulating housing, an insulating material for a solar photovoltaic or electric vehicle, or another electrical equipment component.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A polycarbonate composition comprising, consisting of, or consisting essentially of:
a. from about 45 wt % to about 90 wt % of a polycarbonate homopolymer;
b. from about 1 wt % to about 25 wt % of a polycarbonate copolymer;
c. from about 0.1 wt % to about 20 wt % of a first flame retardant component comprising a brominated flame retardant;
d. from about 0.01 wt % to about 1 wt % of a second flame retardant component comprising an alkyl sulfonate salt, an aromatic sulfone sulfonate, an aromatic sulfonate salt, or a combination thereof; and
e. from about 0.1 wt % to about 20 wt % of a siloxane-free acrylic core-shell impact modifier, wherein the combined weight percent value of all components does not exceed 100 wt %, and all weight percent values are based on the total weight of the composition.

Aspect 2. The thermoplastic composition according to Aspect 1, wherein the polycarbonate copolymer comprises a poly(aliphatic ester-carbonate) copolymer comprising from 0.1 to 10 mol % sebacic acid monomer units and 90-99.9 mol % bisphenol-A monomer units.

Aspect 3. The thermoplastic composition according to Aspect 2, wherein the composition comprises from about 1 wt % to about 20 wt % of the poly(aliphatic ester-carbonate) copolymer.

Aspect 4. The thermoplastic composition according to any of Aspects 1 to 3, wherein the composition has a total bromine content of from about 0.5 wt % to about 8 wt %.

Aspect 5. The thermoplastic composition according to Aspect 4, wherein the total bromine content is from about 1.5 wt % to about 4 wt %.

Aspect 6. The thermoplastic composition according to any of Aspects 1 to 5, wherein the first flame retardant component comprises a brominated polycarbonate, a brominated polyacrylate, a brominated cyanurate, or a combination thereof.

Aspect 7. The thermoplastic composition according to any of Aspects 1 to 6, wherein the siloxane-free acrylic core-shell impact modifier comprises acrylate rubber as the core.

Aspect 8. The thermoplastic composition according to any of Aspects 1 to 7, wherein the composition further comprises from greater than 0 wt % to about 2 wt % of an anti-drip agent.

Aspect 9. The thermoplastic composition according to Aspect 8, wherein the anti-drip agent comprises styrene acrylonitrile encapsulated polytetrafluoroethylene (SAN-PTFE).

Aspect 10. The thermoplastic composition according to any of Aspects 1 to 9, wherein the composition comprises at least one additional additive.

Aspect 11. The thermoplastic composition according to Aspect 10, wherein the at least one additional additive comprises an acid scavenger, an anti-drip agent, an antioxidant, an antistatic agent, a chain extender, a colorant, a release agent, a flow promoter, a lubricant, a plasticizer, a quenching agent, an additional flame retardant, a UV stabilizer, a UV reflecting additive, an additional impact modifier, a blowing agent, a reinforcing agent, or a combination thereof.

Aspect 12. The thermoplastic composition according to any of Aspects 1 to 11, wherein the composition does not include a polyester component.

Aspect 13. The thermoplastic composition according to any of Aspects 1 to 12, wherein the composition is free of siloxane.

Aspect 14. The thermoplastic composition according to any of Aspects 1 to 13, wherein the composition has a comparative tracking index (CTI) rating of PLC0 as determined in accordance with ASTM D3638.

Aspect 15. The thermoplastic composition according to any of Aspects 1 to 14, wherein the composition has a notched Izod impact strength (NII) retention of at least 10% after 3000 hours of DH85 aging at a temperature of 85° C. and 85% relative humidity, wherein NII is evaluated before and after DH85 aging and is tested at a temperature of 23° C. according to ASTM D256.

Aspect 16. The thermoplastic composition according to any of Aspects 1 to 15, wherein the composition has a UL94 flame retardant rating of V0 at a thickness of 1.0 millimeter.

Aspect 17. An article comprising the thermoplastic composition according to any of Aspects 1 to 16.

Aspect 18. The article according to Aspect 17, wherein the article is a component of a consumer electronics device, an electrical connector, an insulating housing, an insulating material for a solar photovoltaic or electric vehicle, or another electrical equipment component.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Comparative and example compositions described herein included one or more of the components listed in Table 1:

TABLE 1

Components

| Component | Description | CAS No. | Supplier | Function |
|---|---|---|---|---|
| PC1 | PCP 1300 100 GRADE PCP Polycarbonate, low flow | 111211-39-3 | SABIC | Resin |
| PC2 | PCHFGRP Polycarbonate, high flow | 111211-39-3 | SABIC | Resin |
| HFD | PCP caped 6 mol % sebacic acid PC copolymer | 137397-37-6 | SABIC | Resin |
| PBT | 315 PBT Poly(butylene terephthalate) | 26062-94-2 | SABIC | Resin |
| FR-245 | 2,4,6-Tris-(2,4,6-tribromophenoxy)-1,3,5-triazine, ~67 wt % Br | 25713-60-4 | ICL | FR |
| F002P | Brominated PC, ~26 wt % Bromine (Br) | 156042-31-8 | SABIC | FR |
| FR-1025 | Brominated polyacrylate, ~72 wt % Br | 59447-57-3 | ICL | FR |
| KSS | 3-Phenylsulfonylbenzenesulfonic acid potassium salt | 63316-43-8 | Arichem | FR |
| EXL-2390 | Core shell acrylic polymer, 0 wt % siloxane | 31261-08-2, 25852-37-3 | DOW | Impact modifier |
| S-2501 | Core shell acrylic polymer, ~10 wt % siloxane | 143106-82-5 | Mitsubishi Chemical | Impact modifier |
| AO1010 | Pentaerythritol tetrakis (3,5-di-tert-butyl-4-hydroxyhydrocinnamate) | 6683-19-8 | BASF | Antioxidant |
| AO168 | Tris(2,4-ditert-butylphenyl)phosphate | 31570-04-4 | BASF | Antioxidant |
| PETS | Pentaerythritol tetrastearate | 115-83-3 | FACI | Mold release |
| UV234 | hydroxyphenyl benzotriazole | 70321-86-7 | BASF | UV Additive |
| TSAN | Styrene acrylonitrile encapsulated polytetrafluoroethylene (SAN-PTFE) | 9002-84-0, 9003-54-7 | SABIC | Anti drip (FR) |
| CB | Carbon black | 1333-86-4 | CABOT | Colorant |
| TiO$_2$ | Titanium dioxide | 13463-67-7 | Kronos | Colorant |

Siloxane content is determined by X-ray fluorescence (Thermo ARL QUANT'X EDXRF); Bromine content is determined according to molecular structure Pellets were compounded from these components on a lab twin-screw extruder (Coperion ZSK-26Mc) with all components fed from main throat. The compounding proceeded at a screw rotation at 200 revolutions per minute (rpm) with a throughput of 20 kilograms per hour (kg/h). Additional details for the compounding are shown in Table 2:

TABLE 2

| Temperature Profiles for Compounding | | |
|---|---|---|
| Compounder Type | | ZSK-26Mc |
| Barrel Size | mm | 1000 |
| Die | mm | 4.4 |
| Zone 1 temperature | °C. | 50 |
| Zone 2 temperature | °C. | 100 |
| Zone 3 temperature | °C. | 200 |
| Zones 4-12 temperature | °C. | 270 |
| Die temperature | °C. | 270 |

Injection molding was conducted on a FANUC S-2000i molding machine for sample bars for tensile, flexural, impact and CTI testing and a Nestal Synergy 1500k-230 molding machine for test bars for UL94 Vx FR testing. Typical injection molding conditions are shown in Table 3:

TABLE 3

| Typical Injection Molding Conditions | | |
|---|---|---|
| Molding parameters | unit | Value |
| Pre-drying time | Hour | 4 |
| Pre-drying temperature | °C. | 120 |
| Zones 1-3 temperature | °C. | 280 |
| Mold temperature | °C. | 80-100 |

Specific gravity was evaluated in accordance with ASTM D792; results are reported in grams per cubic centimeter (g/cm$^3$). Melt flow rate (MFR) was evaluated at 300° C. with a 1.2 kilogram (kg) load according to ASTM D1238; results are reported in grams per 10 minute (g/10 min). Tensile properties were evaluated at a speed of 50 millimeters per minute (mm/min) in accordance with ASTM D638; tensile strength at yield and break are reported in megapascals (MPa), tensile elongation at break is reported in percentage (%). Flexural properties were evaluated at a speed of 1.27 mm/min in accordance with ASTM D790; flexural modulus and flexural strength at yield are reported in MPa. Notched Izod impact (NII) strength was evaluated at the indicated temperature in accordance with ASTM D256; results are reported in joules per meter (J/m). Flame retardant (FR) Vx properties were evaluated using 1.0 mm and 1.2 mm thick bars in accordance with UL94. CTI properties were evaluated in accordance with ASTM D3638; a PLC0 rating is achieved if a tracking resistance of sample is greater than or equal to 50 drops at 300V to 600V. DH85 aging was conducted at 85° C. and 85% relative humidity at various durations (500 hours (h), 1000 h, 2000 h, and 3000 h) and was followed by NII and molecular weight (Mw) testing. Molecular weight (Mw) was evaluated using an Agilent 1260 Infinity high performance liquid chromatography machine with a dichloromethane solvent at 35° C.

Comparative and example compositions were prepared as shown in Tables 4A and 4B; properties of these compositions are shown in Tables 5A and 5B, respectively:

TABLE 4A

| Comparative and Example Compositions | | | | | | | | |
|---|---|---|---|---|---|---|---|---|
| Component | C0 | C1 | C2 | C3 | C4 | C5 | Ex1 | Ex2 |
| PC1 | 49.18 | 54.18 | 51.18 | 60.28 | 57.28 | 60.58 | 54.18 | 51.18 |
| PC2 | 15 | 15 | 15 | 15 | 15 | 15 | 15 | 15 |
| HFD | 10 | 10 | 10 | 10 | 10 | 10 | 10 | 10 |
| PBT | 5 | | | | | | | |
| FR-245 (67 wt % Br) | | | | 3.9 | 3.9 | | | |
| F002P (26 wt % Br) | 10 | 10 | 10 | | | | 10 | 10 |
| FR-1025 (72 wt % Br) | | | | | | 3.6 | | |
| KSS | 0.3 | 0.3 | 0.3 | 0.3 | 0.3 | 0.3 | 0.3 | 0.3 |
| TSAN | 0.5 | 0.5 | 0.5 | 0.5 | 0.5 | 0.5 | 0.5 | 0.5 |
| EXL-2390 (0 wt % siloxane) | | | | | | | 7 | 10 |
| S-2501 (~10 wt % siloxane) | 7 | 7 | 10 | 7 | 10 | 7 | | |
| AO1010/AO168/PETS/UV234/CB/TiO$_2$ | 3.02 | 3.02 | 3.02 | 3.02 | 3.02 | 3.02 | 3.02 | 3.02 |
| Total (wt %) | 100 | 100 | 100 | 100 | 100 | 100 | 100 | 100 |
| Br content in total formulation (wt %) | 2.6 | 2.6 | 2.6 | 2.6 | 2.6 | 2.6 | 2.6 | 2.6 |

TABLE 4B

| Comparative and Example Compositions | | | | | | | |
|---|---|---|---|---|---|---|---|
| Component | Ex3 | Ex4 | Ex5 | C6 | Ex6 | Ex7 | Ex8 |
| PC1 | 60.28 | 57.28 | 60.58 | 55.18 | 55.18 | 45.68 | 56.18 |
| PC2 | 15 | 15 | 15 | 15 | 15 | 15 | 15 |
| HFD | 10 | 10 | 10 | 10 | 10 | 10 | 10 |
| FR-245 (67 wt % Br) | 3.9 | 3.9 | | 6 | 6 | | 6 |

TABLE 4B-continued

Comparative and Example Compositions

| Component | Ex3 | Ex4 | Ex5 | C6 | Ex6 | Ex7 | Ex8 |
|---|---|---|---|---|---|---|---|
| F002P (26 wt % Br) | | | | | | 15.5 | |
| FR-1025 (72 wt % Br) | | | 3.6 | | | | |
| KSS | 0.3 | 0.3 | 0.3 | 0.3 | 0.3 | 0.3 | 0.3 |
| TSAN | 0.5 | 0.5 | 0.5 | 0.5 | 0.5 | 0.5 | 0.5 |
| EXL-2390 (0 wt % siloxane) | 7 | 10 | 7 | | 10 | 10 | 10 |
| S-2501 (~10 wt % siloxane) | | | | 10 | | | |
| AO1010/AO168/PETS/UV234/CB/TiO$_2$ | 3.02 | 3.02 | 3.02 | 3.02 | 3.02 | 3.02 | 2.02 |
| | | | | | | | |
| Total (wt %) | 100 | 100 | 100 | 100 | 100 | 100 | 100 |
| Br content in total formulation (wt %) | 2.6 | 2.6 | 2.6 | 4.0 | 4.0 | 4.0 | 4.0 |

TABLE 5A

Properties of Table 4A Compositions

| Property | C0 | C1 | C2 | C3 | C4 | C5 | Ex1 | Ex2 |
|---|---|---|---|---|---|---|---|---|
| Specific gravity, g/cm$^3$ | 1.23 | 1.23 | 1.22 | 1.22 | 1.21 | 1.22 | 1.22 | 1.22 |
| MFR, g/10 min | 8.8 | 9.1 | 7.4 | 10.8 | 8.3 | 9.3 | 8.9 | 6.8 |
| Tensile modulus, MPa | 2238 | 2066 | 1968 | 2057 | 1936 | 2045 | 2048 | 1941 |
| Tensile strength at yield, MPa | 55.0 | 53.8 | 51.2 | 52.1 | 48.9 | 51.3 | 53.6 | 50.6 |
| Tensile elongation at break, % | 90 | 96 | 95 | 85 | 96 | 105 | 80 | 91 |
| Tensile strength at break, MPa | 57.5 | 59.2 | 94.5 | 54.6 | 55.6 | 59.6 | 54.6 | 56.8 |
| Flexural modulus, MPa | 2140 | 2030 | 1950 | 2090 | 1970 | 2010 | 2030 | 1930 |
| Flexural strength at yield, MPa | 86.6 | 84.0 | 79.1 | 81.0 | 75.6 | 80.6 | 82.9 | 78.3 |
| NII, 23° C., J/m | 761 | 692 | 655 | 738 | 684 | 707 | 684 | 643 |
| NII, −20° C., J/m | 626 | 638 | 586 | 701 | 642 | 384 | 602 | 561 |
| NII, −30° C., J/m | 588 | 590 | 608 | 648 | 645 | 631 | 563 | 531 |
| NII, −40° C., J/m | 306 | 300 | 575 | 368 | 455 | 586 | 352 | 473 |
| V0@1.0 mm, normal, p(FTP) | | <0.3 | | | | | 0.99 | 0.83 |
| V0@1.0 mm, normal, FOT 10(s) | | 116.2 | | | | | 57.3 | 65.7 |
| V0@1.0 mm, aging, p(FTP) | | <0.3 | | | | | 0.99 | 0.99 |
| V0@1.0 mm, aging, FOT 10(s) | | 120.1 | | | | | 63.4 | 53.9 |
| V0@1.0 mm | Fail | Fail | Fail | Fail | Fail | Fail | Pass | Pass |
| V0@1.2 mm, normal, p(FTP) | | 0.92 | | | | | 1.0 | 0.80 |
| V0@1.2 mm, normal, FOT 10(s) | | 56.3 | | | | | 45.1 | 80.3 |
| V0@1.2 mm, aging, p(FTP) | | 0.73 | | | | | 1.0 | 0.76 |
| V0@1.2 mm, aging, FOT 10(s) | | 65.3 | | | | | 47.1 | 60.8 |
| V0@1.2 mm | Fail | Pass | Fail | Fail | Fail | Fail | Pass | Pass |
| CTI | | PLC0 | | PLC0 | | PLC0 | PLC0 | PLC0 |
| DH85 aging (time in hours (h)), NII evaluated at RT (23° C.): | | | | | | | | |
| 500 h: NII (J/m)/Mw retention (%) | 637 | 590 | 599 | 643 | 638 | 590 | 588 | 602 |
| | 83.7% | 85.3% | 91.5% | 87.1% | 93.3% | 83.5% | 86.0% | 87.9% |
| 1000 h: NII (J/m)/Mw retention (%) | 457 | 543 | 569 | 615 | 587 | 513 | 540 | 565 |
| | 60.1% | 78.5% | 86.9% | 83.3% | 85.8% | 72.6% | 78.9% | 87.9% |
| 2000 h: NII (J/m)/Mw retention (%) | | 266 | 448 | 466 | 447 | 355 | 413 | 452 |
| | | 38.4% | 68.4% | 63.1% | 65.4% | 50.2% | 60.4% | 70.3% |
| 3000 h: NII (J/m)/Mw retention (%) | 49 | 51 | 218 | 166 | 25 | 29 | 95 | 201 |
| | 6.4% | 7.4% | 33.3% | 22.5% | 3.7% | 4.1% | 13.9% | 31.3% |
| | C0 | C1 | C2 | C3 | C4 | C5 | Ex1 | Ex2 |

TABLE 5B

Properties of Table 4B Compositions

| Property | Ex3 | Ex4 | Ex5 | C6 | Ex6 | Ex7 | Ex8 |
|---|---|---|---|---|---|---|---|
| Specific gravity, g/cm$^3$ | 1.22 | 1.22 | 1.22 | 1.23 | 1.23 | 1.23 | 1.22 |
| MFR, g/10 min | 10.1 | 7.3 | 9.6 | 8.3 | 7.6 | 7.2 | 7.2 |
| Tensile modulus, MPa | 2071 | 1957 | 2031 | 1977 | 1999 | 1928 | 2085 |
| Tensile strength at yield, MPa | 51.1 | 49.2 | 50.7 | 49.7 | 49.9 | 50.5 | 50.7 |
| Tensile elongation at break, % | 102 | 86 | 91 | 94 | 86 | 88 | 107 |
| Tensile strength at break, MPa | 58.8 | 54.0 | 54.2 | 56.4 | 54.0 | 55.0 | 59.7 |
| Flexural modulus, MPa | 2040 | 1990 | 2050 | 1990 | 1990 | 1910 | 2070 |
| Flexural strength at yield, MPa | 80.0 | 79.3 | 80.8 | 78.0 | 79.3 | 77.9 | 80.8 |

TABLE 5B-continued

Properties of Table 4B Compositions

| Property | Ex3 | Ex4 | Ex5 | C6 | Ex6 | Ex7 | Ex8 |
|---|---|---|---|---|---|---|---|
| NII, 23° C., J/m | 739 | 689 | 716 | 697 | 684 | 613 | 733 |
| NII, −20° C., J/m | 672 | 618 | 651 | 642 | 606 | 535 | 623 |
| NII, −30° C., J/m | 633 | 572 | 646 | 650 | 587 | 488 | 595 |
| NII, −40° C., J/m | 448 | 529 | 580 | 433 | 472 | 365 | 452 |
| V0@1.0 mm, normal, p(FTP) | 1.0 | 0.45 | 0.94 | | 1.0 | 0.78 | 0.99 |
| V0@1.0 mm, normal, FOT 10(s) | 39.9 | 84.8 | 58.9 | | 39.6 | 64.2 | 53.4 |
| V0@1.0 mm, aging, p(FTP) | 0.98 | 0.47 | 0.91 | | 0.99 | 0.98 | 0.99 |
| V0@1.0 mm, aging, FOT 10(s) | 61.6 | 82.3 | 61.8 | | 56.0 | 56.2 | 58.7 |
| V0@1.0 mm | Pass | Pass | Pass | Fail | Pass | Pass | Pass |
| V0@1.2 mm, normal, p(FTP) | 0.99 | 0.80 | 0.95 | | 0.99 | 0.94 | 0.99 |
| V0@1.2 mm, normal, FOT 10(s) | 44.9 | 69.4 | 50.1 | | 46.5 | 59.6 | 44.7 |
| V0@1.2 mm, aging, p(FTP) | 0.99 | 0.53 | 0.97 | | 0.99 | 0.99 | 0.99 |
| V0@1.2 mm, aging, FOT 10(s) | 45.5 | 73.1 | 44.4 | | 42.8 | 52.7 | 46.5 |
| V0@1.2 mm | Pass | Pass | Pass | Fail | Pass | Pass | Pass |
| CTI | PLC0 | PLC0 | PLC0 | PLC0 | PLC0 | PLC0 | PLC0 |
| DH85 aging (time in hours (h)), NII evaluated at RT (23° C.): | | | | | | | |
| 500 h: NII (J/m)/Mw retention (%) | 620 | 632 | 638 | 648 | 650 | 572 | 705 |
| | 83.9% | 91.7% | 89.1% | 93.0% | 95.0% | 93.3% | 96.2% |
| 1000 h: NII (J/m)/Mw retention (%) | 616 | 589 | 574 | 623 | 565 | 531 | 636 |
| | 83.4% | 85.5% | 80.2% | 89.4% | 82.6% | 86.6% | 86.7% |
| 2000 h: NII (J/m)/Mw retention (%) | 482 | 491 | 434 | 505 | 501 | 455 | 577 |
| | 65.2% | 71.3% | 60.6% | 72.5% | 73.2% | 74.2% | 78.7% |
| 3000 h: NII (J/m)/Mw retention (%) | 311 | 236 | 100 | 251 | 261 | 294 | 466 |
| | 42.1% | 34.3% | 14.0% | 36.0% | 38.2% | 48.0% | 63.5% |
| | Ex3 | Ex4 | Ex5 | C6 | Ex6 | Ex7 | Ex8 |

Composition C1 included a siloxane-containing core-shell acrylic polymer impact modifier, while example composition Ex1 included a siloxane-free core-shell acrylic polymer impact modifier. Comparing the C1 to Ex1 it is observed that the siloxane-free core shell impact modifier provided a flame retardance improvement from 1.2 mm V0 to 1.0 mm V0 and an improvement of impact resistance (NII) retention after 2000 h and 3000 h of aging (from 38.4% to 60.4%, and from 7.4% to 13.9%, respectively). Comparing C2-C5 to Ex2-Ex6 with various flame retardant agents and loadings of impact modifiers, the example compositions including a siloxane-free acrylic impact modifier had a significantly improved FR rating to 1.0 mm V0, and improved NII retention after 2000 h/3000 h DH85 aging. Comparing comparative composition C6 with example compositions Ex7 and Ex9, these example compositions had an improved FR rating of 1.0 mm V0 from as compared to C6 (failed rating). The example compositions with a siloxane-free impact modifier maintained good properties with varying types and amounts of flame retardant component. The example compositions with a siloxane-free impact modifier also had a high (PLC0) CTI rating.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A polycarbonate composition comprising:
   a. from about 45 wt % to about 90 wt % of a polycarbonate homopolymer;
   b. from about 1 wt % to about 25 wt % of a polycarbonate copolymer;
   c. from about 0.1 wt % to about 20 wt % of a first flame retardant component comprising a brominated flame retardant;
   d. from about 0.01 wt % to about 1 wt % of a second flame retardant component comprising an alkyl sulfonate salt, an aromatic sulfone sulfonate, an aromatic sulfonate salt, or a combination thereof; and
   e. from about 0.1 wt % to about 20 wt % of a siloxane-free acrylic core-shell impact modifier,
   wherein the composition comprises less than 0.1 wt % siloxane, and
   wherein the combined weight percent value of all components does not exceed 100 wt %, and all weight percent values are based on the total weight of the composition.

2. The thermoplastic composition according to claim 1, wherein the polycarbonate copolymer comprises a poly(aliphatic ester-carbonate) copolymer comprising from 0.1 to 10 mol % sebacic acid monomer units and 90-99.9 mol % bisphenol-A monomer units.

3. The thermoplastic composition according to claim 2, wherein the composition comprises from about 1 wt % to about 20 wt % of the poly(aliphatic ester-carbonate) copolymer.

4. The thermoplastic composition according to claim 1, wherein the composition has a total bromine content of from about 0.5 wt % to about 8 wt %.

5. The thermoplastic composition according to claim 1, wherein the first flame retardant component comprises a brominated polycarbonate, a brominated polyacrylate, a brominated cyanurate, or a combination thereof.

6. The thermoplastic composition according to claim 1, wherein the siloxane-free acrylic core-shell impact modifier comprises acrylate rubber as the core.

7. The thermoplastic composition according to claim 1, wherein the composition further comprises from greater than 0 wt % to about 2 wt % of an anti-drip agent.

8. The thermoplastic composition according to claim 7, wherein the anti-drip agent comprises styrene acrylonitrile encapsulated polytetrafluoroethylene (SAN-PTFE).

9. The thermoplastic composition according to claim 1, wherein the composition comprises at least one additional additive comprising an acid scavenger, an anti-drip agent, an antioxidant, an antistatic agent, a chain extender, a colorant, a release agent, a flow promoter, a lubricant, a plasticizer, a quenching agent, an additional flame retardant, a UV stabilizer, a UV reflecting additive, an additional impact modifier, a blowing agent, a reinforcing agent, or a combination thereof.

10. The thermoplastic composition according to claim 1, wherein the composition does not include a polyester component.

11. The thermoplastic composition according to claim 1, wherein the composition has a comparative tracking index (CTI) rating of PLC0 as determined in accordance with ASTM D3638.

12. The thermoplastic composition according to claim 1, wherein the composition has a notched Izod impact strength (NII) retention of at least 10% after 3000 hours of DH85 aging at a temperature of 85° C. and 85% relative humidity, wherein NII is evaluated before and after DH85 aging and is tested at a temperature of 23° C. according to ASTM D256.

13. The thermoplastic composition according to claim 1, wherein the composition has a UL94 flame retardant rating of V0 at a thickness of 1.0 millimeter (mm).

14. An article comprising the thermoplastic composition according to claim 1, wherein the article is a component of a consumer electronics device, an electrical connector, an insulating housing, or an insulating material for a solar photovoltaic or electric vehicle.

* * * * *